United States Patent
Stendahl et al.

(10) Patent No.: US 6,628,100 B1
(45) Date of Patent: Sep. 30, 2003

(54) CONTROLLER FOR ELECTRICAL MACHINES

(75) Inventors: Henrik Stendahl, Seattle, WA (US); Göran Göransson, Kävlinge (SE); Johan Bengtsson, Göteborg (SE)

(73) Assignee: Emotron AB, Helsingborg (SE)

( * ) Notice: Subject to any disclaimer, the term of this patent is extended or adjusted under 35 U.S.C. 154(b) by 0 days.

(21) Appl. No.: 10/048,177

(22) PCT Filed: Jul. 10, 2000

(86) PCT No.: PCT/SE00/01465

§ 371 (c)(1),
(2), (4) Date: Jul. 17, 2002

(87) PCT Pub. No.: WO01/10010

PCT Pub. Date: Feb. 8, 2001

(30) Foreign Application Priority Data

Jul. 30, 1999 (SE) .............................................. 9902821

(51) Int. Cl.[7] .............................................. H02P 7/05
(52) U.S. Cl. ...................................... 318/701; 318/254
(58) Field of Search ................................ 318/254, 439, 318/138, 701

(56) References Cited

U.S. PATENT DOCUMENTS

| | | | |
|---|---|---|---|
| 4,868,478 A | 9/1989 | Hedlund et al. | |
| 5,043,643 A | 8/1991 | Hedlund et al. | |
| 5,321,342 A * | 6/1994 | Kruse .......................... | 318/254 |
| 5,525,887 A * | 6/1996 | Van Sistine .................. | 318/701 |
| 5,859,518 A | 1/1999 | Vitunic | |
| 6,051,942 A * | 4/2000 | French ........................ | 318/254 |
| 6,339,307 B1 * | 1/2002 | Andersson et al. ......... | 318/701 |
| 6,359,412 B1 * | 3/2002 | Heglund ...................... | 318/701 |
| 6,366,048 B2 * | 4/2002 | Greif ........................... | 318/701 |
| 6,442,535 B1 * | 8/2002 | Yifan ........................... | 310/165 |

FOREIGN PATENT DOCUMENTS

WO   WO99/09646   2/1999

OTHER PUBLICATIONS

Harris, W.D. et al.: "A simple motion estimator for variable–reluctance motors"; IEEE Transactions on Industry Applications, Mar.–Apr. 1990, USA, vol. 26, No. 2, pp. 237–243, XP002114052.

* cited by examiner

*Primary Examiner*—Robert E. Nappi
*Assistant Examiner*—Eduardo Colon-Santana
(74) *Attorney, Agent, or Firm*—Burns, Doane, Swecker & Mathis, L.L.P.

(57) ABSTRACT

A control circuit for a reluctance machine having two mutually movable parts and at least one inductive phase winding adapted for a certain maximum drive current value. The method includes detecting when a phase winding is in a non-drive mode; causing a test current, having a second maximum value lower than said certain maximum value, to flow through the phase winding and through a current sensor when the winding is in the non-drive mode; and establishing a mutual position in dependence of the output of said current sensor.

21 Claims, 6 Drawing Sheets

CONTROLLER FOR ELECTRICAL MACHINES

FIELD OF THE INVENTION

The present invention relates to a control circuit for a reluctance machine and to a method of operating such a control circuit.

RELEVANT ART

Reluctance machines have two parts, which are movable in relation to each other, commonly called the "stator" and the "rotor", respectively. The most common types of reluctance machines have a rotor that is suspended so that it can rotate inside a stator. The machine is provided with coils, which can be provided with electrical current so as to produce a magnetic flow. The rotor in combination with the stator form a magnetic circuit through which the magnetic field produced by the coils flows.

When the mutual position between the rotor and the stator changes then the reluctance in the magnetic circuit changes.

In order to drive a reluctance motor with a number of windings the current is connected to the windings in a way which depends upon the mutual position of the rotor and the stator.

A known way of providing this control of the current includes sensing the position of the rotor with the help of separate position sensors coupled to the rotor, whereby the position sensors produce an output signal which depends on the position of the rotor.

Another known way of achieving control of phase currents uses the fact that the inductance of a phase varies depending on the position of the rotor in relation to the stator.

The U.S. Pat. No. 5,043,643 describes a method of determining the position of the rotor for a reluctance machine starting from the equation $$(J-Ri)=d/dt(Li),$$

where i is the current through the phase windings, where U is the voltage across a series connection of the phase winding, a transistor valve and a current sensor resistor, and where R is a predetermined constant corresponding to the sum of the resistances in a phase winding, an activated transistor and a current measuring resistor.

SUMMARY OF THE INVENTION

The momentary inductance of a winding can be determined by providing a voltage pulse having a certain amplitude to a winding and measuring the current-time response. Hence, an inductance value can, for example, be calculated by measuring the amplitude of the current at a certain time after switching on the pulse. Alternatively an inductance value can be calculated by measuring the amount of time until a certain current amplitude has been reached. In both cases, however, the measurement involves the provision of voltage pulses to the winding. The provision of such voltage pulses with a certain repetition frequency may cause noise to be generated by vibrations in the components.

The present invention relates to the problem of improving the performance of a control circuit for a reluctance machine.

This problem is solved by a control circuit for a reluctance machine having two mutually movable parts and at least one inductive phase winding, the inductance of which depends on the mutual position of the parts; the control circuit comprising:

a first terminal and a second terminal for connection to a power source;

valve means for setting the winding in a drive mode so as to cause a drive current to flow through the winding, the drive current having a certain maximum value; and means for establishing said mutual position in dependence of a measured current value and/or time value. According to an embodiment of the invention, the control circuit includes a current sensor for measurement of a test current when the winding is in a non-drive mode, the current sensor being adapted for measurement of test currents having a second maximum value lower than said certain maximum value; wherein said position establishing means is adapted to establish said mutual position in dependence of said test current.

This solution advantageously enables position measurements using lower current amplitudes. The lower current amplitudes advantageously leads to reduced noise from the reluctance machine, since the noise level is closely connected with the current amplitudes.

Additionally the above solution enables more frequent current measurements, thereby improving the versatility of the control circuit. Since the position and the inductance value, using the above described control circuit, can be established with a lower current top value, the repetition frequency can also be increased. This is due to the fact that a lower top current value through the winding at the end of a voltage pulse corresponds to a lower amount of stored energy in the winding. Hence, the stored energy in the winding can be drained faster and a new measurement cycle can be initiated that much earlier. Thus the inductance measurement procedure can be used at a higher machine speed. According to referred embodiments the current measurement can have a repetition frequency of more than one kilo-hertz. Preferably the current measurement repetition frequency is higher than 1,5 kHz.

With a more frequent current measurement the inaccuracy of the resulting inductance determinations is also reduced, leading to more accurate position determination for a reluctance machine in motion. This positive effect is obtained since the shortened duration of the current measurement procedure, when the reluctance machine is in motion, leads to smaller movement of the rotor during the measurement procedure. Since the inductance is position dependent, the reduced rotor movement leads to reduced inductance change due to movement during the current measurement procedure.

Since the present current measurement solution makes it possible to perform the inductance-measurement using separate current sensors $S3_A$, $S3_B$, $S3_C$ it is possible to use lower current values during the measurement for establishing the momentary inductance value of the winding. In other words the ratio between the maximum drive current and the maximum test current is increased. An increase of this ratio is advantageous since the test current may produce a negative torque when the test current flows through a winding which is in a non-drive mode. Hence, a high ratio between the maximum drive current and the maximum test current reduces the impact of any negative torque produced by the test current In effect, an increased ratio between the maximum drive current and the maximum test current renders improved performance of the reluctance machine.

According to an embodiment the control circuit operates to control the valves to prevent currents exceeding said second maximum value from flowing through the current sensor. The second maximum value may be 5 percent of the drive current maximum value.

The control circuit further comprises means for establishing a rate of change for the test current in response to said time value and said current value; said rate of change being indicative of the momentary inductance of the winding. The position establishing means is adapted to establish said mutual position in dependence of said rate of change.

DESCRIPTION OF PREFERRED EMBODIMENTS

For the sake of simplicity, the invention will be described in the following with reference to rotating machines. The invention is, however, not limited to rotating machines but that which is described is also applicable to other machines, such as e.g. linear machines where a moving part made of a soft magnetic material is linearly displaceable along a straight linear stator with a number of stator windings. The invention is applicable to a control circuit for a reluctance machine operating as a motor, but also to a control circuit for a reluctance machine operating as a generator FIG. 1A is a schematic view illustrating an embodiment of a reluctance machine 10 with a stator 20 and a rotor 30 rotatable inside the stator.

The stator 20 is provided with three separate windings $W_A$, $W_B$ and $W_C$, respectively.

Figure 1A:
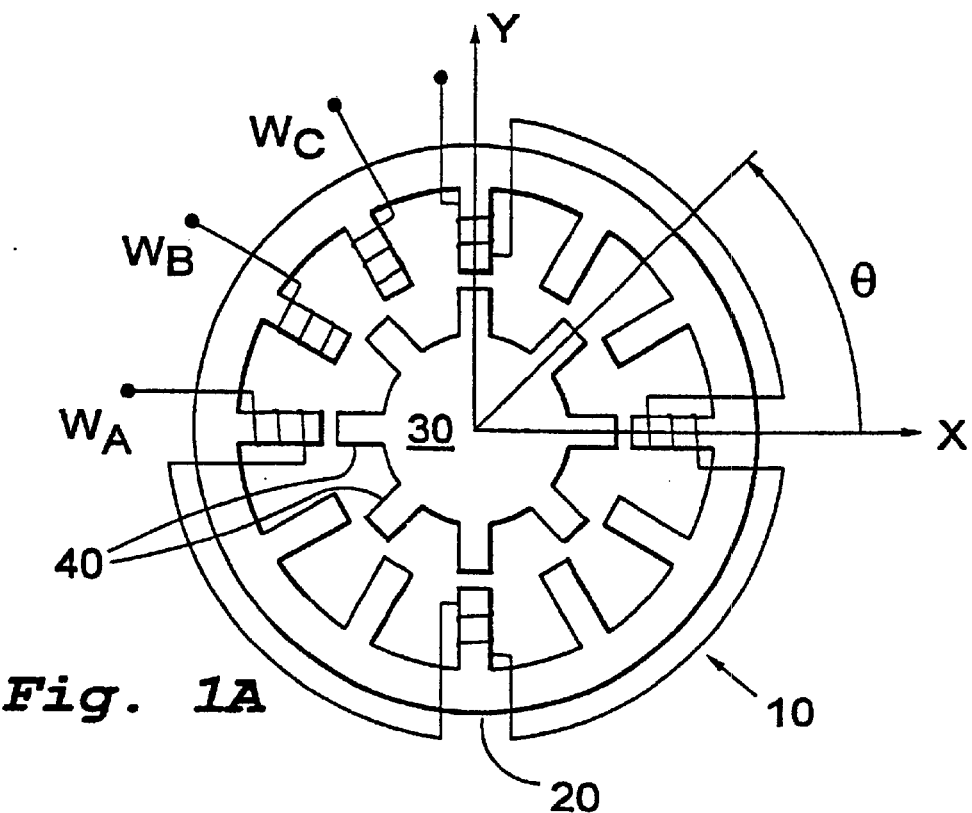
FIG. 1A is a schematical principle sketch of an electrical machine with two mutually movable parts and phase windings.

According to one embodiment the rotor is manufactured from a soft magnetic material comprising a number of projections 40 as illustrated in FIG. 1A. The soft magnetic material is a ferromagnetic material which, when it has been magnetized once, can very easily be demagnetized, i.e. only a small coercive power is required for removal of the magnetism which arose when the material was magnetized. According to one version of the invention the rotor comprises soft magnetic iron. According to one embodiment also the stator includes a soft magnetic material, such as e.g. soft magnetic iron.

When the rotor is turned around a central shaft, its position changes, which is illustrated by means of the angular position θ in FIG. 1A. As illustrated in FIG. 1, an imaginary co-ordination system has its origin at the central shaft of the motor, with two mutually orthogonal axes x resp. y. The position of the rotor can then be defined as the angular position θ of a rotor projection 40 in relation to the x-axis.

Figure 1B:
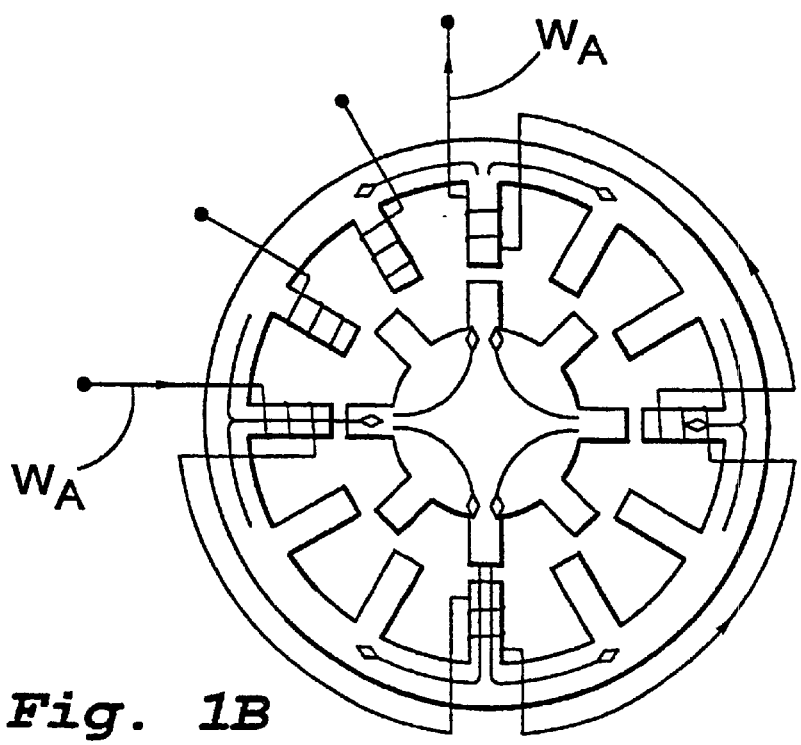
FIG. 1B illustrates a magnetic flow in the machine according to FIG. 1A.

When current is driven through a winding, e.g. winding $W_A$, a magnetic flow which flows from the stator via the rotor and back to the stator is produced, and thereby a magnetic circuit is produced. FIG. 1B illustrates an example of such a magnetic circuit for a three-phase reluctance motor in the case that current would be driven through the winding $W_A$ when the projection of the rotor is directed towards the parts of the stator where the magnetic field-producing windings $W_A$ is placed. It should be noted that FIG. 1B only illustrates the principle for the magnetic flow and should not be interpreted such that the current necessarily must be driven through a winding when the rotor is in the position shown in FIG. 1B.

The current to the phase windings of the motor should be controlled so that the current is supplied when the position of the rotor in relation to the stator is such that the torque of the motor is optimized.

FIGS. 1A and 1B illustrate a machine with three windings, the rotor of which has eight projections and the stator of which has twelve projections. According to a preferred embodiment the rotor, however, has four projections, so-called salient poles, and the stator has six projections.

Figures 2A, 2B:
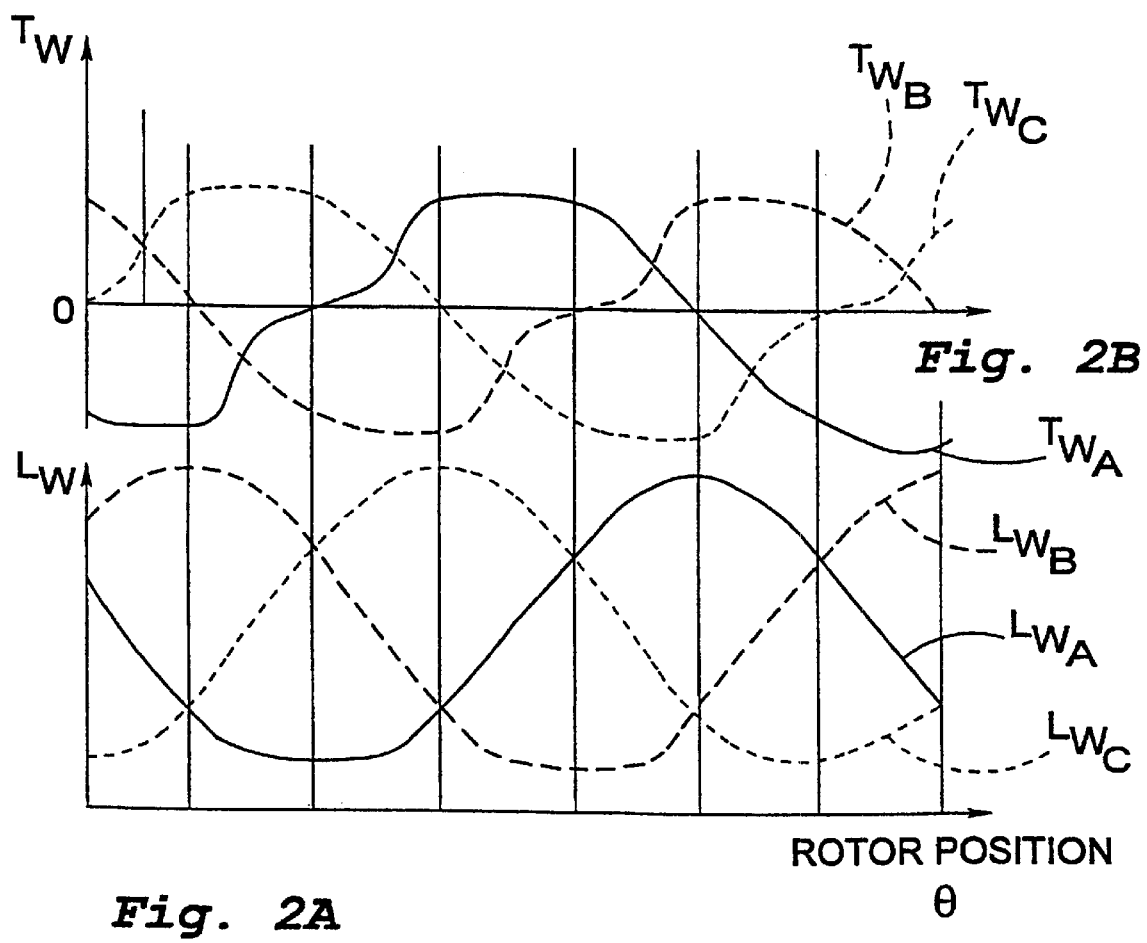
FIG. 2A illustrates that the inductance in a winding in a machine according to FIG. 1A varies, depending on the mutual position between the movable parts.
FIG. 2B illustrates the positional dependence of the torque which can be obtained by activating of a phase winding.

FIG. 2A illustrates how the inductance varies in the winding $W_A$ depending on the position θ of the rotor.

FIG. 2B illustrates the torque which can be obtained, in rotor position θ, by activation of a phase winding. By comparison of the curve illustrating the inductance $L_{WA}$ for winding $W_A$ with the curve illustrating the torque $T_{WA}$ achieved by activation of the winding $W_A$ (the solid lines in FIG. 2A and FIG. 2B, respectively), it can be seen that a positive torque is obtained from the winding $W_A$ if this winding is excited when the inductance has a positive derivative.

This means that during certain drive conditions, when a maximum torque is required in the forward direction, it is preferable to excite winding $W_A$ such that a current flows through the winding while in rotor positions where $T_{WA}$ has a positive value. In rotor positions where $T_{WA}$ has a negative value winding $W_A$ should preferably be unexcited, i.e. no drive current should flow through the winding at such positions. Likewise, windings $W_B$ and $W_C$ should be controlled to be excited or unexcited in the corresponding manner in respect of optimum torque $T_{WB}$ and $T_{WC}$, respectively.

An Embodiment of a Control Apparatus

Figure 3:
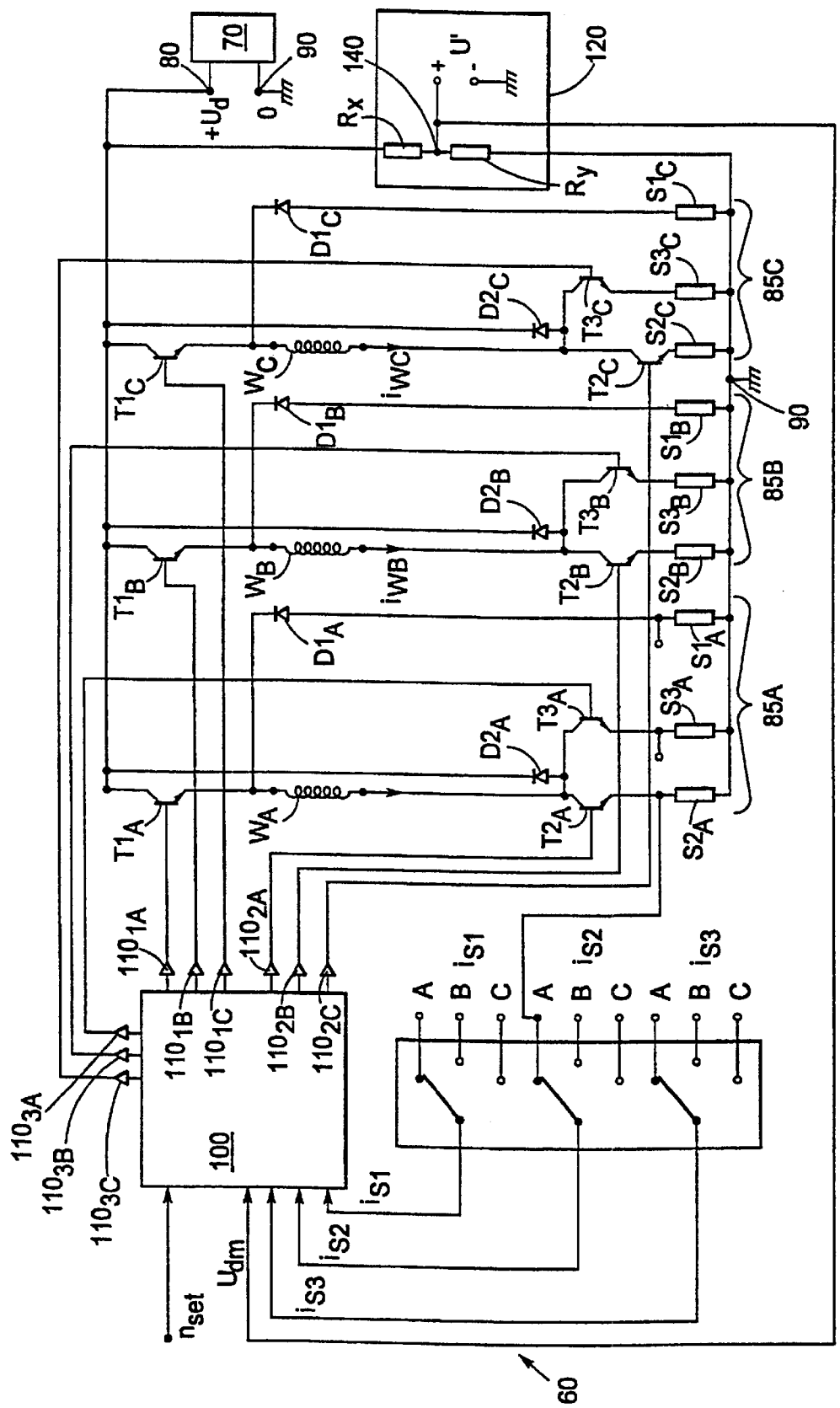
FIG. 3 illustrates a control apparatus with valve bridges connected to the phase windings in the motor according to FIG. 1A.

FIG. 3 illustrates a control apparatus 60 connected to the three phase windings $W_A$, $W_B$ and $W_C$. The control apparatus 60 comprises a power source 70 which supplies a DC-voltage with an amplitude of $+U_d$ to a connection 80. The phase winding $W_A$ is coupled between the ground connection 90 of the voltage source and the plus pole 80 via a bridge circuit 85A.

The bridge circuit 85A comprises a first power transistor $T1_A$ for coupling connection 80 to one end of the winding $W_A$, and a second power transistor $T2_A$ in series with a current sensor $S2_A$ coupled between the other end of the winding and ground connection 90, as shown in FIG. 3. A diode $D1_A$, in series with a current sensor $S1_A$, is connected between the ground connection 90 and the emitter of the transistor $T_{2A}$ such that the cathode of the diode is coupled to the emitter of the transistor $T1_A$. A diode $D2_A$ is connected so that its cathode is connected to the collector of the power transistor $T1_A$ and its anode is coupled to the collector of the power transistor $T2_A$. Additionally bridge 85A comprises a series connection of a third transistor valve $T3_A$ and a third current sensor $S3_A$. The third transistor valve $T3_A$ and the third current sensor $S3_A$ are coupled in parallel with the second power transistor $T2_A$ and second current sensor $S2_A$.

Although described with reference to power transistors, an active valve $T1_A$, $T2_A$, $T3_A$ may be constituted for example a bipolar transistor, a thyristor, an IGBT or a MOSFET. The passive valves $D1_A$, $D2_A$ may be constituted by diodes, such as e.g. SCHOTTKY-diodes.

The other phase windings $W_B$ and $W_C$, respectively, are coupled to bridge circuits 85B and 85C, respectively, in the same manner as the first winding $W_A$.

A control unit 100 comprising a microprocessor is arranged to control the transistor valves. The control unit 100 has nine outputs which are connected each via its own amplifier 110 to the base of its own of the six transistor valves. The controller 100 may be embodied as a Digital Signal Processor (DSP) having a timer for so as to enable time measurements.

The current sensors $S1_A$, $S2_A$ and $S3_A$ are, according to one embodiment, Hall sensors which supply measured current values to the control unit 100. According to a preferred embodiment, however, the current sensors $S1_A$, $S2_A$ and $S3_A$ comprise shunt resistors, and the current is measured as a voltage drop over the respective resistor.

The sensed signal, indicative of the current through the sensor $S2_A$, is delivered to the control unit via a multiplexer 115. Sensed signals from sensors $S1_A$, and $S3_A$ are delivered to respective inputs of the control unit 100 via the multiplexer in the same manner. The multiplexer operates to take samples of the measured currents from the three windings $W_A$, $W_B$, $W_C$ in a controlled manner such that the control unit 100 can operate as if it had access to continuous measurement values. The multiplexer is controlled and synchronized by the control unit 100 to achieve this.

In the same way the measured current values for the windings $W_B$ and $W_C$ are supplied to the control unit 100.

A sensor unit 120 is connected so that it senses the voltage $U_d$ between the positive pole 80 and the ground connection 90. The sensor unit 120 supplies a measured voltage value $U_{dm}$ to the control unit 100. The sensor unit 120 includes, according to one embodiment, a voltage divider with resistors $R_X$ and $R_Y$, which are connected between the positive voltage connection 80 and the ground connection 90. As is illustrated in FIG. 3, the output of the sensor unit 120 is connected to a point 140 between the resistors $R_X$ and $R_Y$ so that the output signal $U_{dm}$ of the sensor is proportional to the drive voltage $U_d$.

Figure 4A:
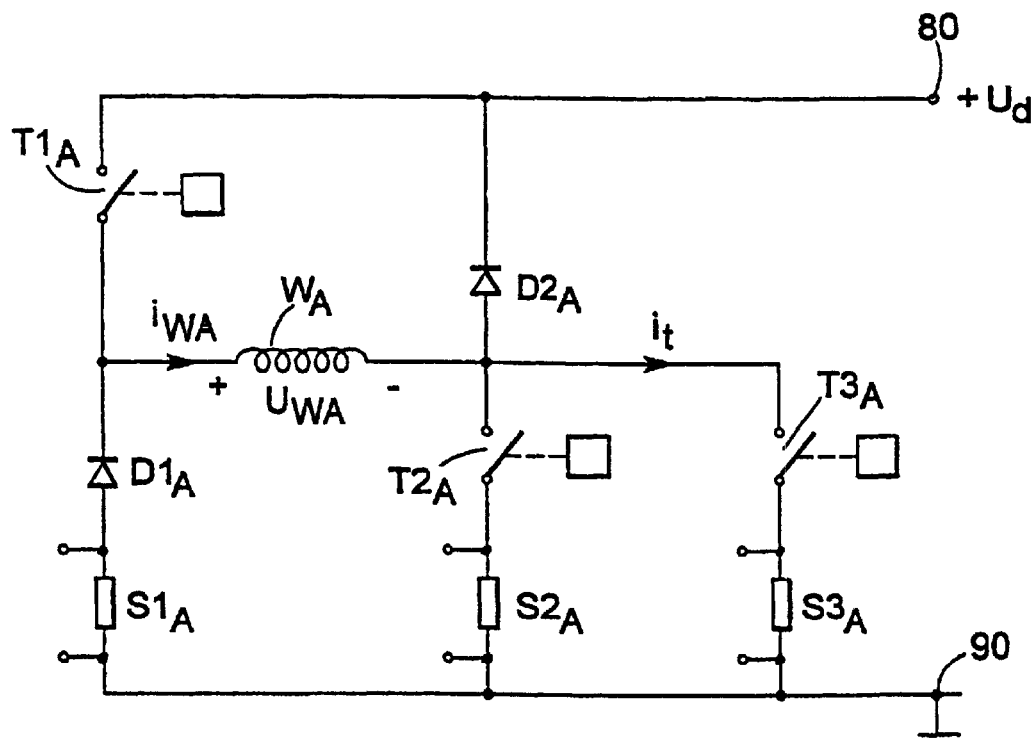
FIG. 4A is an equivalent circuit diagram for one of the valve bridges of FIG. 3.

Whereas sensors $S1_A$, $S1_B$, $S1_C$ and sensors $S2_A$, $S2_B$, $S2_C$ are primarily used for establishing whether or not any current flows through the relevant leg of the circuit, the sensors $S3_A$, $S3_B$, $S3_C$ are used for establishing a momentary inductance in the relevant winding $W_A$, $W_B$, $W_C$(cf FIG. 4A). FIG. 4A is a circuit diagram illustrating the valve bridge 85A for winding $W_A$ in FIG. 3.

Figure 4B:
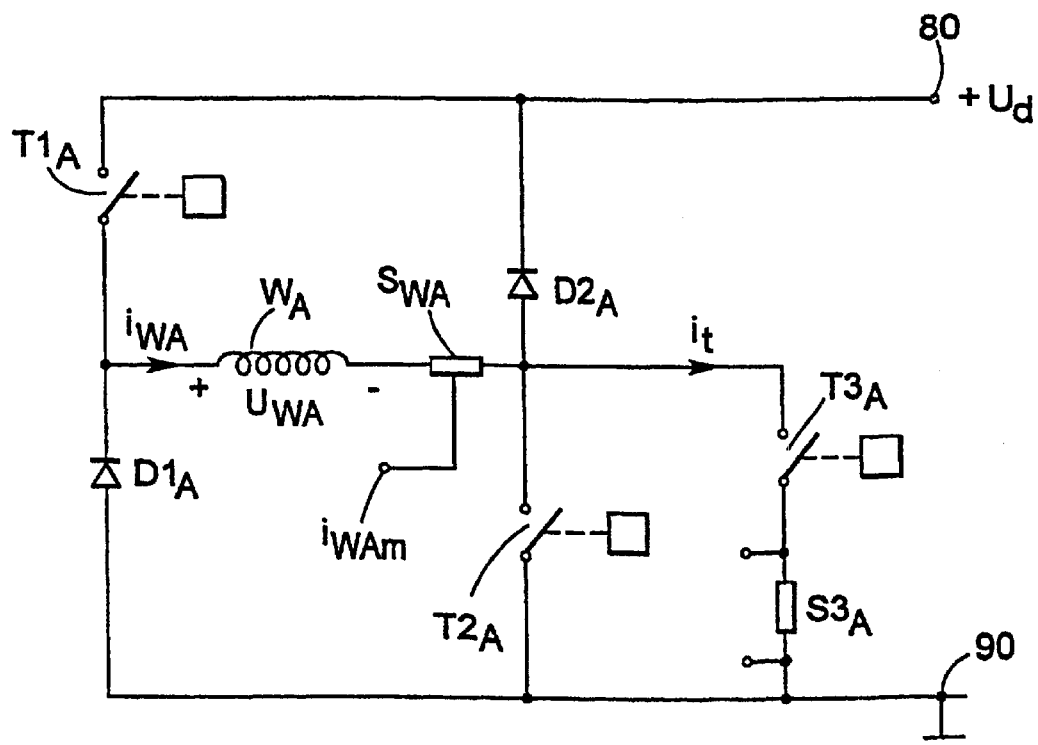
FIG. 4B is an equivalent circuit diagram for another embodiment a valve bridge.

With reference to FIG. 4B there is shown an alternative embodiment of a valve bridge. In that embodiment the drive currents may be measured with a Hall sensor $S_{WA}$ connected in series with the winding $W_A$. The Hall sensor thus replaces the current sensors S1 and S2 shown in FIG. 4A.

Since the present current measurement solution makes it possible to perform the inductance-measurement using separate current sensors $S3_A$, $S3_B$, $S3_C$ it will be possible to use lower current values during the measurement for establishing the momentary inductance value of the winding. In other words the ratio between the maximum drive current $i_{Wmax}$ and the maximum test current $i_{test\_max}$ is increased. An increase of this ratio is advantageous since the test current may produce a negative torque (cf FIG. 2B) when the test current flows through a winding which is in a non-drive mode. Hence, the lower the test current in relation to the drive current, the better it is.

According to preferred embodiments of the invention the ratio between the maximum drive current $i_{Wmax}$ and the maximum test current $i_{test\_max}$ is higher than 20. According to an embodiment of the invention the ratio between the maximum drive current $i_{max}$ and the maximum test current $i_{test\_max}$ is 40 or higher. According to some embodiments the ratio is higher than 100. According to most preferred embodiments the ratio is 120 or higher.

The control apparatus 60 can be adapted for different working conditions and for different reluctance machines. The below first example relates to a control apparatus adapted for driving a reluctance machine with a high drive voltage Ud and a low motor power.

EXAMPLE 1A

Ud=300 Volts $i_{Wmax}$=3,0 Ampere

Inductance in windings $W_A$, $W_B$, $W_C$ is position dependent within the approximate range 0,16 Henry to 1,6 Henry.

Resistance in sensors $S2_A$, $S2_B$, $S2_C$ and in sensors $S1_A$, $S1_B$, $S1_C$ is 50 milliOhms.

Resistance in current sensors $S3_A$, $S3_B$, $S3_C$ is 100 Ohms.

Maximum test current through $S3_A$, $S3_B$, $S3_C$ is 25 milliamperes.

The ratio between the maximum drive current $i_{Wmax}$ and the maximum test current $i_{test\_max}$ is in this example: $i_{Wmax}/i_{test}$=120

Using this maximum test current the measurement procedure described with reference to FIG. 5 below can be repeated up to 3750 times per second (a repetition frequency of 3,75 kHz).

EXAMPLE 1B

Ud=300 Volts $i_{Wmax}$=3,0 Ampere

Inductance in windings $W_A$, $W_B$, $W_C$ is position dependent within the approximate range 0,16 Henry to 1,6 Henry.

Resistance in sensors $S2_A$, $S2_B$, $S2_C$ and in sensors $S1_A$, $S1_B$, $S1_C$ is 50 milliOhms.

Resistance in current sensors $S3_A$, $S3_B$, $S3_C$ is 100 Ohms.

Maximum test current through $S3_A$, $S3_B$, $S3_C$ is 5 milliamperes.

The ratio between the maximum drive current $i_{Wmax}$ and the maximum test current $i_{test\_max}$ is in this example: $i_{Wmax}/i_{test}$=600

Using this maximum test current, the measurement procedure described with reference to FIG. 5 below can be repeated up to 18750 times per second (a repetition frequency of 18,75 kHz).

EXAMPLE 2

An example of a control apparatus adapted for driving a reluctance machine with a low drive voltage Ud and a medium motor power has the following parameter values:

Ud=24 Volts $i_{Wmax}$=200 Amperes

Inductance in windings $W_A$, $W_B$, $W_C$ is position dependent within the approximate range 1/12 milliHenry to 1 milliHenry.

A Hall sensor (FIG. 4B) adapted to enable measurement of currents up to 200 Amperes is used.

Resistance in current sensors $S3_A$, $S3_B$, $S3_C$ is 1,0 Ohm.

Maximum test current through $S3_A$, $S3_B$, $S3_C$ is 2 Amperes. Using this maximum test current, the measurement procedure described with reference to FIG. 5 below can be repeated more than 2500 times per second (a repetition frequency of more than 2500 Hz). According to a preferred embodiment the repetition frequency is about 6000 Hz).

The ratio between the maximum drive current $i_{Wmax}$ and the maximum test current $i_{test\_max}$ is in this example: $i_{Wmax}/i_{test}=100$.

With reference to Example 2 it is to be noted that if a 1 Ohm shunt sensor were used instead of the Hall sensor the maximum drive current would be limited to 24 Amperes, and consequently it would not work. If, on the other hand, the Hall sensor (adapted to enable measurement of currents up to 200 A) were used for producing the measurement values for establishing the momentary inductance instead of using the sensor S3, the measurement current $i_{test}$ would have to be larger, or the Hall sensor output would have to be amplified. A larger measurement current would lead to larger negative torque, having negative implications as discussed above. Amplification of a low output signal involves an amplifier having a number of components whose inaccuracy adds to the measurement signal. Hence, the measurement would be less accurate, than that disclosed in Example 2.

EXAMPLE 3

Another example of a control apparatus adapted for driving a reluctance machine has the following parameter values:

Ud=300 Volts $i_{Wmax}$=2,0 Amperes

Inductance in windings $W_A$, $W_B$, $W_C$ is position dependent within the approximate range 0,22 Henry to 1,8 Henry.

Resistance in current sensors $S3_A$, $S3_B$, $S3_C$ is 10 Ohms.

Maximum test current through $S3_A$, $S3_B$, $S3_C$ is 50 milliamperes. Using this maximum test current, the measurement procedure described with reference to FIG. 5 below can be repeated up to 1670 times per second (a repetition frequency of 1,67 kHz).

The ratio between the maximum drive current $i_{Wmax}$ and the maximum test current $i_{test\_max}$ is in this example: $i_{Wmax}/i_{test}=40$.

With reference to FIG. 4A it can be seen that four alternative excited working states, also referred to as drive states, can occur for a winding depending on which of the valves $T3_A$, $T2_A$ and/or $T1_A$ are closed or open respectively. Although the following is described for winding $W_A$, the same working states are available for the other windings.

WSI. A First Working State

In a first working state WSI both the valve $T2_A$ and the valve $T1_A$ are conducting, and valve $T3_A$ is non-conducting. In this state a drive current will flow from the plus pole 80 through valve $T1_A$ via the winding, valve $T2_A$ and current sensor $S2_A$ to ground 90.

WSII A Second Working State

In a second working state (WSII) the active valves $T1_A$ resp. $T2_A$ are blocked so that they are non-conducting, and a current flows in the winding from the ground connection 90 to the positive connection 80. $T3_A$ is also blocked in this working state.

WSIII A Third Working State

In a third working state (WSIII) only one of the valves, $T1_A$, is conducting, and when the winding still contains energy so as to drive a current, that current flows in the circuit defined by $D2_A$, $T1_A$ and the winding.

WSIV A Fourth Working State

In a fourth working state (WSIV) only one of the valves, $T2_A$, is conducting, and when the winding still contains energy so as to drive a current, that current flows in the circuit defined by $T2_A$, $S2_A$, $S1_A$, $D1_A$ and the winding.

The above four states WSI–WSIV are considered as drive states, since they may involve currents of a drive magnitude through the winding, i.e. currents of importance for the generation of significant torque, as discussed in connection with FIG. 2 above. Currents of a magnitude less than 5 percent of maximum drive current, may be considered not to be of drive magnitude. The provision of the third current sensor $S3_A$ advantageously enables current measurement with a reduced measuring inaccuracy, as will be described in further detail below.

WSIV A Fifth Working State

In the fifth working state WSV the valve $T3_A$ and the valve $T1_A$ are conducting, and valve $T2_A$ is non-conducting. In this state a test current $i_t$ will flow from the plus pole 80 through valve $T1_A$ via the winding, valve $T3_A$ and current sensor $S3_A$ to ground 90.

WSVI A Sixth Working State

In a sixth working state only one of the valves, $T3_A$, is conducting, and when the winding contains energy so as to cause a current to flow, that current flows in the circuit defined by $T3_A$, $S3_A$, $S1_A$, $D1_A$ and the winding.

The fifth and the sixth working states may be used in combination for determining the momentary inductance of the winding in an advantageous manner. This will be described in further detail below.

An Embodiment of a Current Measurement Method

The control unit 100 determines the actual working state for the winding $W_A$ with the help of the input signals from the current sensors $S1_A$, $S2_A$, $S3_A$ and the output signals from the amplifiers $110_{1A}$, $110_{2A}$ and $110_{3A}$. By combining the logical values for these signals the actual working state can be deduced.

The reluctance machine may be controlled to run by means of switching the drive valves $T1_A$ and $T2_A$, respectively, so as to provide the desired torque by use of selected combinations of the above described drive states WSI–WSIV. The control method for running the machine may involve any of a plurality of known methods wherein valve $T3_A$ is kept in a non-conducting state during the drive excitation of the winding. According to an embodiment of the invention the reluctance machine, is controlled in a manner similar to the method described in U.S. Pat. No. 4,868,478 the content of which is hereby incorporated by reference. In accordance with the invention, however, the current measurements used for establishment of the momentary inductance in a non-energized phase winding are performed by means of the current sensors S3.

Figure 5:
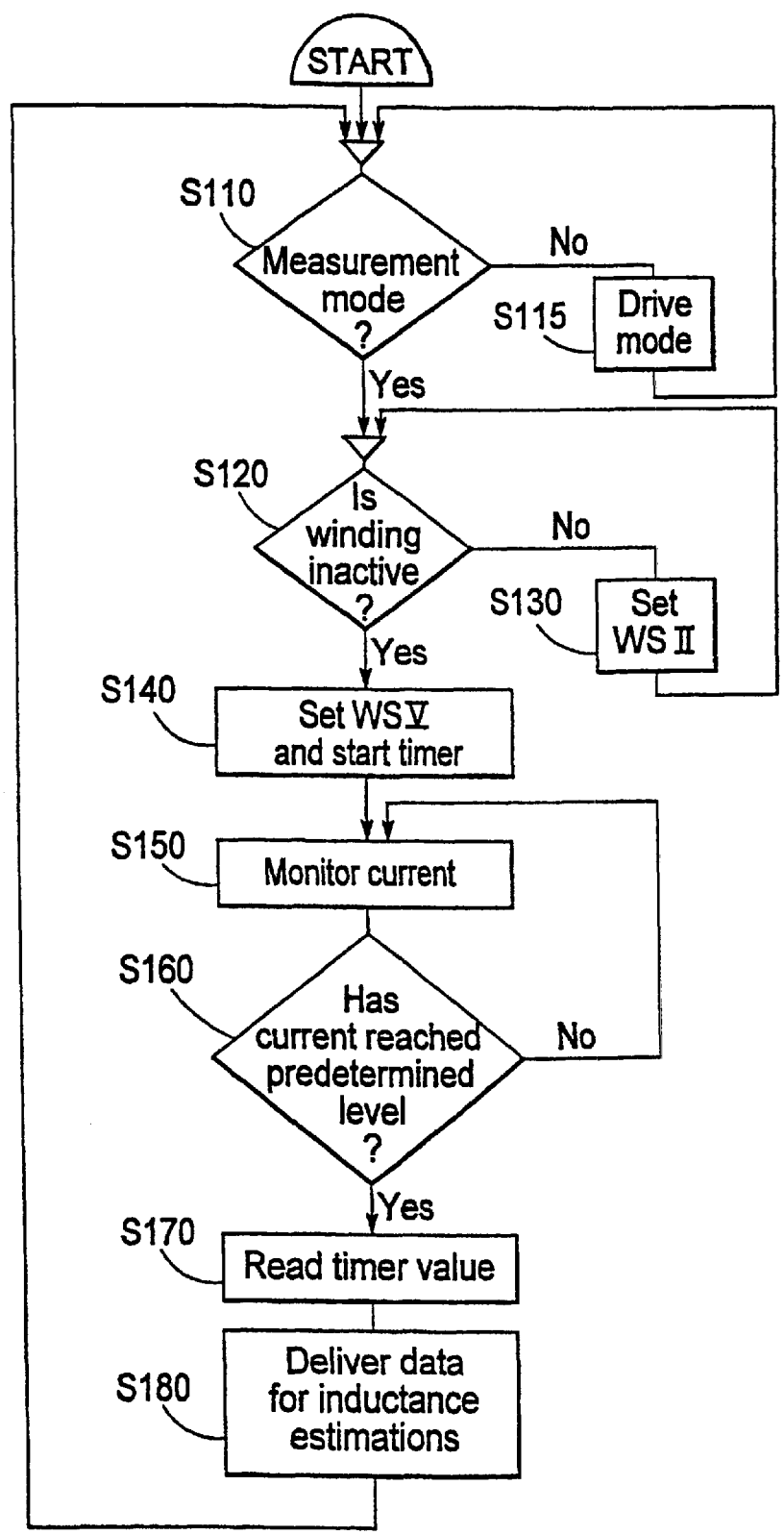
FIG. 5 is a flow chart illustrating an embodiment of a measurement procedure.

FIG. 5 illustrates an embodiment of a method according to the invention. In a step S110 there is performed a test for establishing whether the phase winding is in a measurement mode or in a drive mode. This is determined in dependence on whether the relevant winding e.g $W_A$ is in a position to provide a positive torque. When, for example, winding $W_A$ is in a position to provide positive torque and there is a current exceeding a certain magnitude flowing through winding $W_A$, then that phase winding is in a drive mode. If winding $W_A$ is in a position to provide negative torque, then that phase winding is in a measurement mode, according to one embodiment The final determination of operational mode is made by the controller 100, and hence it depends on whether the controller wishes the winding to produce torque (positive or negative) or to provide measurement data for inductance estimations. If the winding is not in a measurement mode it will be in a drive mode, as illustrated by step S115 in FIG. 5. In drive mode the controller 100 will control the current to the phase by using some or all of the working states WSI–WSIV.

If the winding is in a measurement mode, the next step (S120) is to test whether the winding is inactive, i.e. whether the current $I_{WA}$ has reached zero. This test may involve measurements of voltage levels at both ends of the winding $W_A$ using a high impedance resistor network connected to ground and to $+U_d$ for providing defined voltage levels at both ends of the winding even when no current flows through the winding. With reference to FIG. 4A, the current $I_{WA}$ through the winding can be established to be zero when the voltage level at the left end of the winding is equal to the voltage level at the right end of the winding.

If the test step S120 establishes that the winding current is not zero, the controller will set the bridge in state WSII so as to discharge the energy of the winding in a quick manner (step S130). The controller will also monitor the winding current by means of the above mentioned voltage measurements so as to keep the bridge in state WSII until the current reaches zero.

When the current has been established to be zero, step S140 will be performed. In step S140 the controller 100 switches to the fifth working state WSV so as to provide a voltage pulse with amplitude $+U_d$ across the winding using valves $T3_A$ and $T1_A$. In this state a current will flow from the plus pole 80 through valve T1 via the winding, valve T3 and current sensor S3 to ground 90. Synchronously with the switching of the bridge to state WSV, a timer is started by the controller 100 for measuring the amount of time it takes for the current to reach a predetermined level. The amount of time depends on the instantaneous inductance in the winding.

The time is measured by monitoring the current (S150) so as to detect (S160) when the current reaches the predetermined level. When the predetermined current level is detected timer value is read (S170), and the time-value is delivered (S180) to a process for inductance estimation. Step S180 is followed by a repetition of step S110.

The current measurement according to steps S150, S160 is made using current sensor $S3_A$. According to a preferred embodiment sensor $S3_A$ comprises a resistor having a well defined resistance, and a comparator for sensing the voltage across the resistor. The comparator delivers an indicator signal to the controller 100 (See FIG. 3) when the detected voltage reaches the predetermined level. On reception of the indicator signal the controller reads the timer value. This embodiment is preferred because an accurate timer is easily integrated in the computer operated controller, and the comparator component quickly reacts on detection of the predetermined voltage level.

Hence, it is evident from the above that the controller 100 can control the switches $T1_A$, $T2_A$, $T3_A$ to prevent the drive current from flowing through the current sensor $S3_A$ during the drive states. In effect, the controller 100 controls the switches $T1_A$, $T2_A$, $T3_A$ to prevent currents exceeding 5 percent of maximum drive current from flowing through the current sensor $S3_A$. The fact that the current sensor $S3_A$ does not need withstand currents of drive magnitude makes it possible to use a current sensor having a very small inaccuracy in the measurement range up to about 5 percent of the maximum drive current.

The test current sensor $S3_A$ may be selected to have a resistance of about the same magnitude as the resistance of the winding $W_A$. According to an embodiment of the invention the resistance $R_{S3A}$ in test current sensor $S3_A$ is selected to any value higher than about half of the resistance $R_{WA}$ of the corresponding winding $W_A$:

$$R_{S3A}/R_{WA} > 1/2$$

According to another embodiment the resistance in test current sensor $S3_A$ is selected such that the ratio between the resistance $R_{S3A}$ in test current sensor and the resistance $R_{WA}$ in corresponding winding $W_A$ is higher than 1/1.

$$R_{S3A}/R_{WA} > 1/1$$

According to some embodiments the ratio $R_{S3A}/R_{WA}$ is higher than 5/1.

$$R_{S3A}/R_{WA} > 5/1$$

When the test current sensor comprises a test resistor $S3_A$ having a well defined resistance and a comparator 200 (See FIG. 6) for sensing the voltage across the test resistor it is possible to use a test resistor having a relatively high resistance and a small inaccuracy.

The method has been described with reference winding $W_A$ but the same method may advantageously be implemented for the other windings of the electrical machine to be controlled.

The above measurement method results in current and time values which can be used for establishing the instantaneous inductance of the winding.

The torque $T_{WA}$, which is obtained by activating the winding $W_A$, is a function of the current through the winding and the position $\theta$ of the rotor.

$$T_{WA} = f_1(i_{WA}, \theta) \qquad (1)$$

The rotor position $\theta$ can be calculated from the magnetic flow $\psi$ which flows through the corresponding magnetic circuit and the phase current $i_{WA}$:

$$\theta = f_2(i_{WA}, \psi_A) \qquad (2)$$

This means that the torque $T_{WA}$ can be expressed as a function of the magnetic flow $\psi_A$ which flows through the corresponding magnetic circuit and the phase current $i_{WA}$:

$$T_{WA} = f_3(i_{WA}, \psi_A) \qquad (3)$$

As mentioned above, the current $i_{WA}$ through a phase winding is controlled so that a desired torque $T_W$ is obtained from the activated phase winding, as shown in FIG. 2B. The torque obtained is a function partly of the winding current $i_{WA}$ and partly of the magnetic flow. The magnetic flow $\psi$ depends in turn on the inductance $L_{WA}$ and the current $i_{WA}$. Consequently, $T_{WA}$ is dependent on $i_{WA}$ and $L_{WA}$:

$$T_{WA} = f_4(i_{WA}, L_{WA}) \qquad (4)$$

The inductance $L_{WA}$ can be determined by integration over time, as described in U.S. Pat. No. 5,043,643:

$$L_A(t_1) = 1/i(t_1) * \int_{t0}^{t1} (U_{WA} - i_{WA}R_{WA})dt \qquad (5)$$

where:
- t0 is the point of time when valve T3A is set to conduct so as to supply a voltage across the winding.
- t1 is the point of time when the measurement current has reached the predetermined value.

For certain control conditions the inductance $L_{WA}$ can be determined by a simplified version of equation (5). In fact the momentary inductance $L_{WA}$ can be calculated as:

$$L_A(t_1) = 1/i(t_1) * U_{WA} * (t_1 - t_0) \qquad (6)$$

A good estimation of the rotor position θ and of the available torque can be calculated from this inductance value $L_A(t_1)$ and the phase current $i_{WA}$.

A Second Embodiment of a Current Measurement Method

According to another embodiment the inductance (and the position) can be determined by measuring the amount of time it takes for the current to sink from a certain start value down to a certain stop value. Such a measurement may be performed using the above described sixth working state. The certain stop value for the test current may be zero, or a suitable level deviating from zero.

Figure 6:
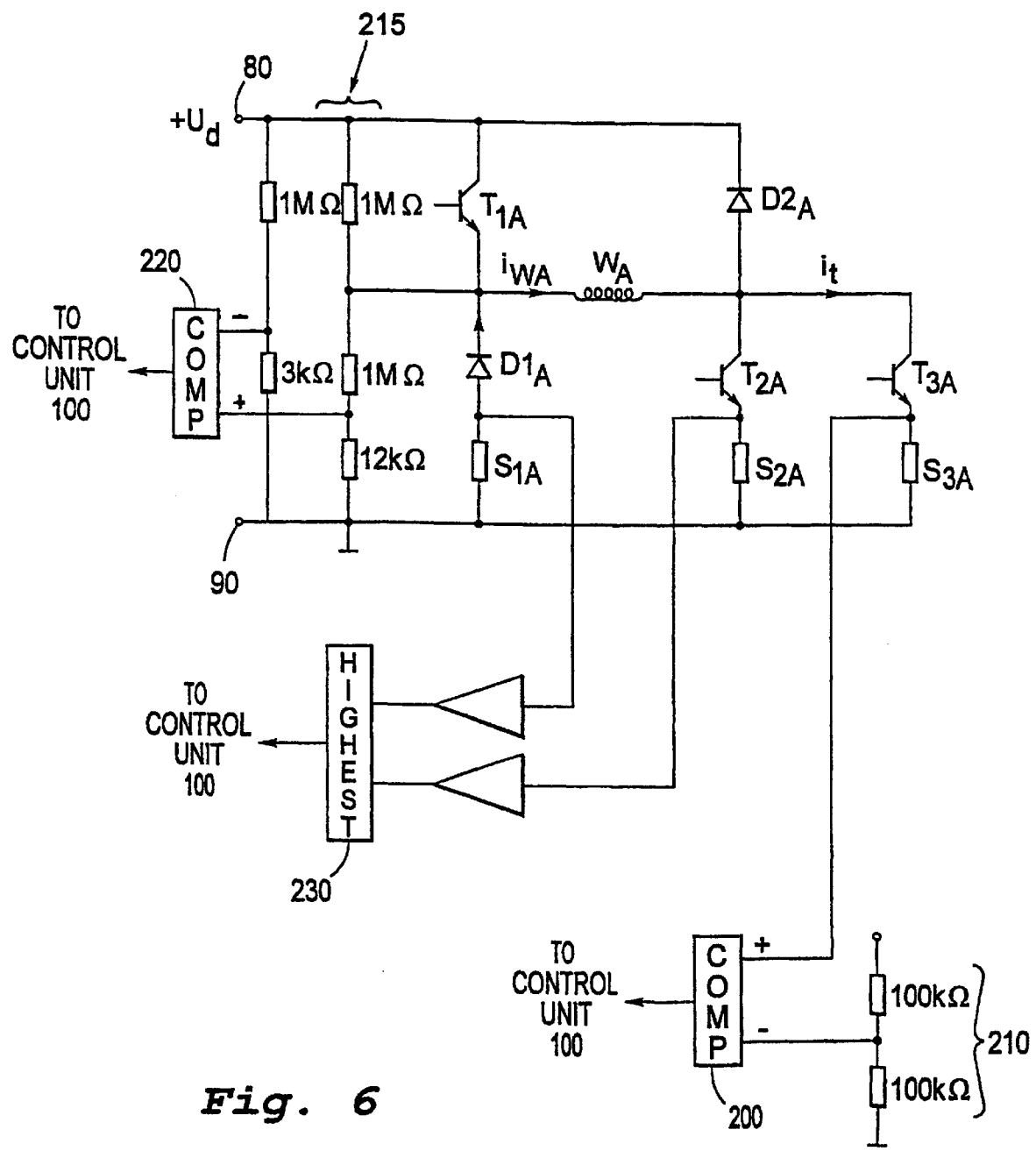
FIG. 6 is an equivalent circuit diagram for an alternative embodiment of a valve bridge.

FIG. 6 is an alternative embodiment of a valve bridge. The FIG. 6 embodiment corresponds essentially to the FIG. 4A embodiment. In the FIG. 6 embodiment, however, the circuitry is simplified by using comparators for indicating when certain limit values are obtained. As illustrated in FIG. 6, a comparator 200 compares the voltage over sensor $S_{3A}$ with a reference value obtained by a voltage divider 210. A voltage divider 215 provides a defined voltage amplitude to the winding even if all valves are non-conducting, and a comparator 220 is arranged to detect the amplitude. A comparator 230 indicates whether sensor $S_{1A}$ or $S_{2A}$ detects the highest current A plurality of valve bridges according to FIG. 6 can be coupled to a controller 100 as described in connection with FIG. 3.

What is claimed is:

1. A control circuit for a reluctance machine having two mutually movable parts and at least one inductive phase winding, the inductance of which depends on the mutual position of the parts; the control circuit comprising:
   a first terminal and a second terminal for connection to a power source;
   valves for setting the winding in a drive mode so as to cause a drive current to flow through the winding, the drive current having a certain maximum value; and
   means for establishing said mutual position in dependence of a measured current value and/or time value;
   wherein
      the control circuit includes a current sensor for measurement of a test current when the winding is in a non-drive mode, the current sensor being adapted for measurement of test currents having a second maximum value lower than said certain maximum value;
      said position establishing means is adapted to establish said mutual position in dependence of said test current; and
      the control circuit operates to control the valves to prevent currents exceeding said second maximum value from flowing through the current sensor.

2. The control circuit according to claim 1, wherein said second maximum value is 5 percent of the drive current maximum value.

3. The control circuit according to claim 1, wherein
   the control circuit controls the valves such that during said drive mode the drive current does not flow through the test current sensor.

4. The control circuit according to claim 1, wherein
   said current sensor has a resistance; said resistance being selected such that the ratio between the resistance in the current sensor and the resistance in corresponding winding $W_A$ is higher than 1/2.

5. The control circuit according to claim 4, wherein
   the resistance in test current sensor is selected such that said ratio is higher than 1/1.

6. The control circuit according to claim 1, further comprising:
   a test valve for setting the winding in a non-drive mode so as to cause a test current to flow through the winding and through said current sensor.

7. The control circuit according to claim 1, further comprising:
   means for establishing a rate of change for the test current in response to said time value and said current value; said rate of change being indicative of the momentary inductance of the winding.

8. The control circuit according to claim 7, wherein:
   said position establishing means is adapted to establish said mutual position in dependence of said rate of change.

9. The control circuit according to claim 1, wherein the ratio between the drive current maximum value and the test current maximum value is higher than 20.

10. A method of operating a control circuit for a reluctance machine having two mutually movable parts and at least one inductive phase winding, the inductance of which depends on the mutual position of the parts; the method comprising the steps of:
    setting the winding in a drive mode so as to cause a drive current to flow through the winding, the drive current having a certain maximum value; and
    establishing said mutual position in dependence of a measured current value and/or time value;
    causing a test current to flow through the phase winding and through a current sensor when the winding is in a non-drive mode, the test current having a second maximum value lower than said certain maximum value;
    establishing said mutual position in dependence of said current sensor; and
    preventing currents exceeding said second maximum value from flowing through the current sensor.

11. The method according to claim 10, wherein
    said second maximum value is 5 percent of the drive current maximum value.

12. The method according to claim 10, comprising
    operating the control circuit such that the drive current does not flow through the test current sensor.

13. The method according to claim 11, further comprising the step of:
    setting the winding in a non-drive mode so as to cause a test current to flow through the winding and through said current sensor.

14. The method according to claim 10, further comprising the step of:

establishing a rate of change for the test current in response to said time value and said current value; said rate of change being indicative of the momentary inductance of the winding.

15. The method according to claim 14, wherein:

said mutual position is established in dependence of said rate of change.

16. The method according to claim 10, further comprising the steps of:

controlling the drive current and the test current such that the ratio between the drive current maximum value and the test current maximum value is higher than 20.

17. A method of operating a control circuit for a reluctance machine having two mutually movable parts and at least one inductive phase winding adapted for a certain maximum drive current value; the method comprising the steps of:

detecting when a phase winding is in a non-drive mode;

causing a test current, having a second maximum value lower than said certain maximum drive current value, to flow through the phase winding and through a current sensor when the winding is in the non-drive mode;

establishing a mutual position in dependence of the output of said current sensor; and preventing currents exceeding said second maximum value from flowing through the current sensor.

18. The method according to claim 17, further comprising the step of:

establishing a rate of change for the test current in response to said current sensor output; said rate of change being indicative of the momentary inductance of the winding.

19. The method according to claim 17, wherein said second maximum value is 5 percent of the drive current maximum value.

20. The method according to claim 17, comprising operating the control circuit such that the drive current does not flow through the test current sensor.

21. The method according to claim 17, comprising measuring the time until said test current reaches a certain current value, or establishing a change in the test current value during a certain time.

* * * * *